United States Patent [19]

Trutna, Jr.

[11] 4,297,600

[45] Oct. 27, 1981

[54] MULTIPATH RAMAN CELL FOR WAVELENGTH CONVERSION

[75] Inventor: William R. Trutna, Jr., Palo Alto, Calif.

[73] Assignee: Board of Trustees of Leland Stanford University, Stanford, Calif.

[21] Appl. No.: 916,592

[22] Filed: Jun. 19, 1978

[51] Int. Cl.² ............................................. H03F 7/00
[52] U.S. Cl. ............................. 307/426; 204/157.1 R; 204/DIG. 11
[58] Field of Search ................... 307/426; 331/94.5 C; 204/157.1 R, DIG. 11

[56] References Cited

U.S. PATENT DOCUMENTS 3,365,671   1/1968   Kogelnik ................... 331/94.5 C X Primary Examiner—Rudolph V. Rolinec
Assistant Examiner—Darwin R. Hostetter
Attorney, Agent, or Firm—Harry E. Aine

[57] ABSTRACT

The wavelength of an optical pump beam is down converted to a longer wavelength in a Raman active gaseous medium by stimulated Raman scattering. The Raman active gaseous medium is contained in the space between a pair of optical reflectors of an optical resonator of the type for producing a focus of the optical beam energy at a point intermediate the length of the resonator within the Raman active medium to enhance conversion of pump energy into the output longer wavelength of the Stokes wave. The pump beam is directed into the optical resonator at an angle to the optical axis of the optical resonator such that the optical beam path is folded back and forth within the optical resonator to cause the beam spot to walk over the surfaces of the reflectors and out of the optical resonator. The multipass Raman cell of the present invention is particularly useful for down converting pump wave energy in the infrared at relatively high power levels to Stokes wave infrared energy of longer wavelengths, such as at 16 microns, for producing a dissociation of molecules as may be employed for isotope separation.

8 Claims, 4 Drawing Figures

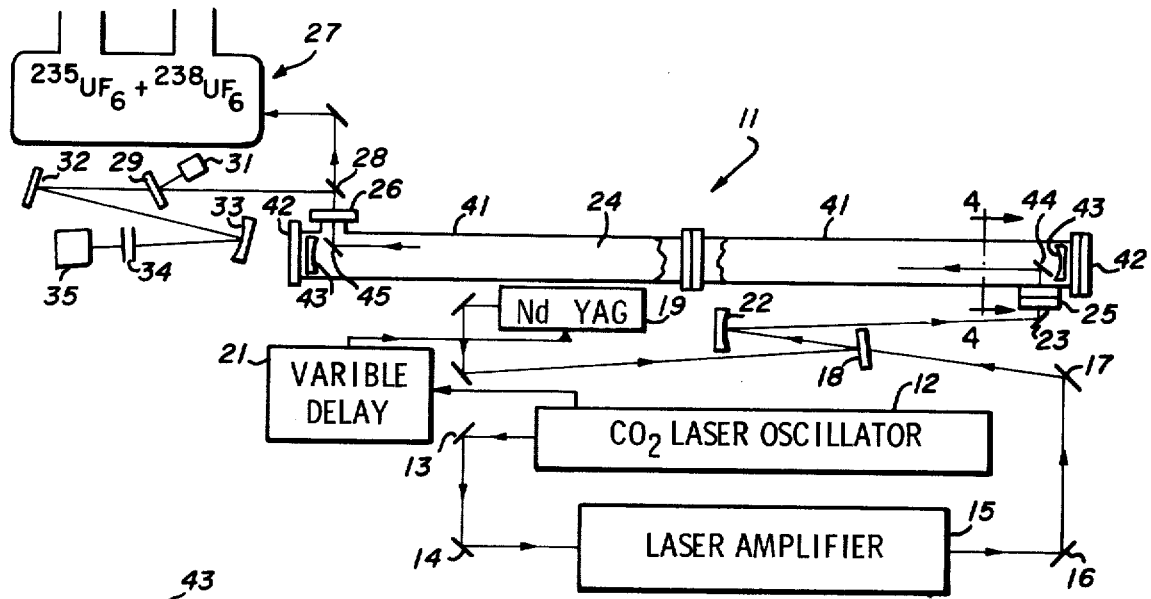
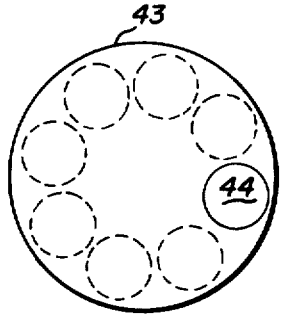
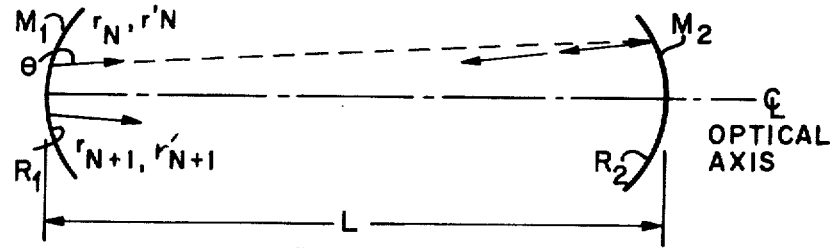
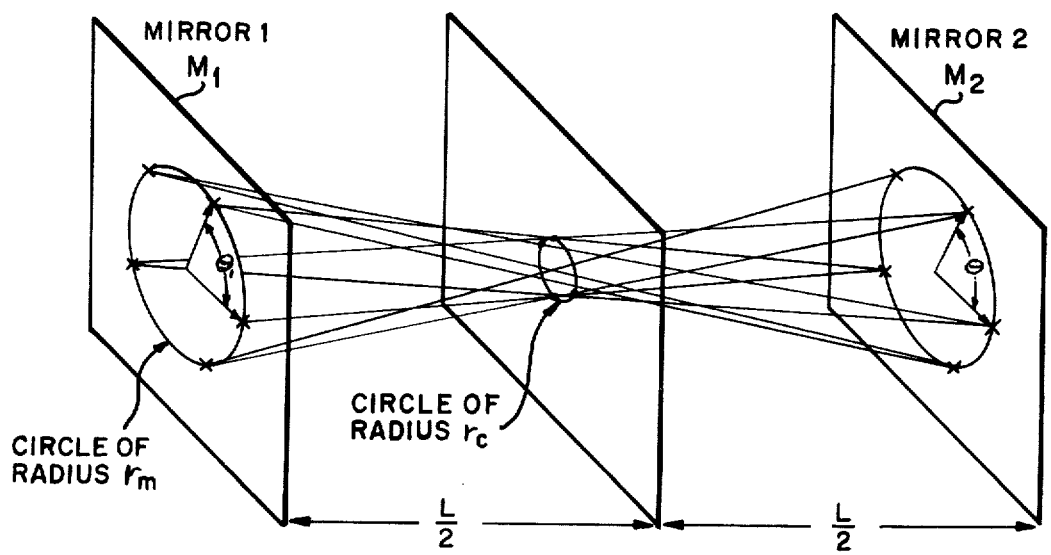

MULTIPATH RAMAN CELL FOR WAVELENGTH CONVERSION

BACKGROUND OF THE INVENTION

The present invention relates in general to Raman cells for wavelength down conversion, particularly in the infrared range, and, more particularly, to an improved Raman cell particularly useful for wideband high average power applications such as those employed in isotope separation processes.

DESCRIPTION OF THE PRIOR ART

Heretofore, it has been proposed to down convert infrared laser radiation of a wavelength longer than 2.4 microns by injecting the pump wave at wavelengths longer than 2.4 microns, such as at 10.6 microns, into a Raman active medium such as para-hydrogen gas to down convert the pump energy to a wavelength of approximately 16 microns with sufficient intensity to produce dissociation of $^{235}UF_6$ into $^{235}UF_5$ which precipitates for isotope separation. Such a scheme is disclosed and claimed in copending U.S. patent application Ser. No. 795,199, filed May 9, 1977.

In this prior art system, the Raman active cell consisted of a relatively long tube containing the Raman active medium with the pump beam being directed longitudinally through the Raman active cell. The problem with this prior art arrangement is that the power density of the pump beam must be relatively high over a relatively long distance within the Raman active medium in order to produce efficient conversion of the pump wave energy into the longer wavelength output Stokes wave energy. For an input pump wave of an energy of 2 J with a 70 nanosecond pulse length at a wavelength of 10.6 microns, with a para-hydrogen Raman active medium at a pressure of between 1.5 and 4 atmospheres, the interaction length within the Raman active cell is required to be on the order of 100 meters long. This is a relatively long length for the Raman active cell and it is desired to provide a cell which can handle the relatively high power density requirements but which is much shorter in overall length.

It is also known from the prior art to provide a relatively long optical path by folding the optical path back and forth between two spherical or aspherical mirrors to provide an output beam which can be well separated from previous reflections with 1000 or more passes between the mirrors. Such an optical resonator has been proposed for use as a folded optical delay line. Such a delay line is disclosed in an article appearing in Applied Optics, Volume 4, No. 8 of August 1965, pages 883-889.

It is also known from the prior art to provide a relatively long folded optical beam path system between a pair of spherical mirrors wherein the wave energy within the device comprises energy directed along an optical beam path which is off the optical axis of the resonator so that the beam is caused to walk over the surfaces of the mirrors along circles or elipses. Such an off axis spherical mirror resonator has been proposed for use as an interferometer or as the resonator of a laser amplifier in an article appearing in Applied Optics, Vol. 3, No. 4, of April 1964, pages 523-526.

SUMMARY OF THE PRESENT INVENTION

The principal object of the present invention is the provision of an improved Raman cell for wavelength down conversion.

In one feature of the present invention, a Raman active cell is proposed for wavelength down conversion which includes a pair of reflectors dimensioned and arranged so that the pump beam wave is injected into the resonator at an angle to the optical axis so that the pump wave and down converted output Stokes wave are caused to traverse a plurality of transits within the cell such that the beam spots on the reflectors are caused to walk over the surface of the reflectors and out of the cell, thereby folding the path length of the cell and permitting a realtively short cell to be employed while providing relatively long Raman active interaction regions therewithin.

In another feature of the present invention, the optical reflectors of the resonator are arranged so that the beam, on each transit through the cell is caused to be focused at a point intermediate the length of the cell defined between the reflectors, whereby relatively high power densities are produced within the Raman active medium between the reflectors while permitting relatively low power densities to be intercepted on the surfaces of the reflectors.

In another feature of the present invention, the reflectors of the optical resonator are metallic mirrors, whereby relatively broadband operation is obtained in the infrared wavelengths greater than 1 micron so that the cell may be employed to extremely high power densities such as those used in extremely high average power commercial isotope separation systems requiring average power handling capabilities on the order of hundreds of kilowatts.

Other features and advantages of the present invention will become apparent upon a perusal of the following specification taken in connection with the accompanying drawings wherein;

BRIEF DESCRIPTION OF THE DRAWINGS

FIG. 1 is a schematic block diagram of a system incorporating a Raman active cell of the present invention.

FIG. 2 is a schematic diagram of a one dimensional optical resonator incorporating features of the present invention, FIG. 3 is a schematic perspective view of a 3-dimensional optical resonator incorporating features of the present invention, and FIG. 4 is an enlarged schematic sectional view of a portion of the structure of FIG. 1 taken along line 4—4 in the direction of the arrows.

DESCRIPTION OF THE PREFERRED EMBODIMENTS

Referring now to FIG. 1 there is shown a system for down converting $CO_2$ laser output at 10.6 microns wavelength to longer wavelength infrared output Stokes wave energy at 16.95 microns for use in photochemistry, isotope separation, and the like. More particularly, a relatively high output power $CO_2$ laser oscillator 12, such as a Lumonics model 103 oscillator commercially available from Lumonics of Ontario, Canada, produces an output pulse having an energy of approximately 0.5 J for a pulse duration of 70 nanoseconds at an output wavelength of 10.6 microns. The output beam is reflected from mirrors 13 and 14 into a Lumonics model 102A amplifier cell 15 for amplifying the output of the laser oscillator 12 to an output energy of approximately 2 J at a pulse width of 70 nanoseconds at 10.6 microns with a pulse repetition rate of approximately 1.0 hertz.

The output of the amplifier 15 is fed via mirrors 16 and 17 to a beam combiner 18, as of Zn Se commercially available from II-VI Corporation of Waltham, Massachusetts. In the beam combiner 18, the output energy of the amplifier at 10.6 microns is combined with output energy at 1.06 microns derived from a Nd:YAG laser 19 which is commercially available from Quanta-Ray, Inc., of Mountain View, California. The output energy from the Nd:YAG laser consists of pulses, as of 8 nanoseconds in duration, each pusle having an output energy at 1.06 microns of approximately 100 mJ with a pulse repitition rate of 10 Hz.

Timing for synchronization of the Nd:YAG laser 19 is obtained from the $CO_2$ laser oscillator 12 by means of a variable time delay 21 which receives a firing signal from the laser $CO_2$ laser oscillator 12 and delays that for firing of the Q-switch of the Nd:YAG laser 19 so as to produce temporal and spacial overlap of the Nd:YAG laser pulses and output pulses of the amplifier 15 in the beam combiner 18.

The output of the beam combiner 18 is fed to a 9 meter focal length mirror 22 which directs the combined beams via mirror 23, into an active cell 24 via input window 25, as of two inch diameter ⅜ inch thick KCl crystal commercially available from Harshaw Inc., of Cleveland, Ohio. The Raman active cell 24 has a length of approximately 4 meters and is filled with a Raman active medium such as para-hydrogen gas at a pressure of between 1.5 and 4 atmospheres, and preferably 3 atmospheres, derived from a liquid hydrogen source. As an alternative embodiment, the Raman active medium may comprise $D_2$ or HD. the details of the Raman active cell 24 are more fully described below with regard to FIGS. 3 and 4.

Within the Raman active cell 24, the combined beams at 1.06 and 10.6 microns are caused to traverse approximately 25 transits of the Raman active cell for stimulating Raman radiation and for converting pump energy at a wavelength of 10.6 microns, derived from the $CO_2$ oscillator 12 into down converted Stokes wave energy of a wavelength of approximately 16 microns which exits from the Raman active cell 24 after approximately 25 transits via output window 26 of essentially the same characteristics as those of input window 25.

The output beam of the Raman cell containing the Stokes wave and the nonconverted portion of the pump wave can be directed to a utilization device such as an isotope separation chamber containing expansion cooled $UF_6$ comprising a relatively small percentage i.e., 3% of $^{235}UF_6$ and remainder being $^{238}UF_6$. It is desired to separate $^{235}UF_6$ from the $^{238}UF_6$. This is accomplished by selectively exciting the abosrption band of the $^{235}UF_6$ gas at an infrared wavelength of approximately 16 microns. The absorption band information of this chemical reaction is more fully disclosed in the aforecited U.S. application Ser. No. 795,199. The irradiation line width of the output Stokes wave energy is sufficiently narrow so as to selectively excite the $^{235}UF_6$ without exciting the $^{238}UF_6$. After approximately four 16 micron photons have been absorbed by the $^{235}UF_6$ molecule, the vibrational mode of the molecule is excited into a region which more nearly approximates a continuum, and thereafter is further excited and elevated in energy by absorbing additional photons not only at 16 microns, but at the pump wavelength of the $CO_2$ laser, namely 10.6 microns, until the $^{235}UF_6$ dissociates to produce the reaction products of $^{235}UF_5$ and fluorine. The $^{235}UF_5$ precipitates for subsequent collection. The $^{238}UF_6$ is exhausted with the fluorine from the chamber 27.

As an alternative, the utilization device may comprise merely an energy detector for measuring the power and wavelengths of the output waves. In that case, a mirror 28 directs the output beam into an energy detector 27. The energy detector includes a KCl beam splitter 29 which reflects the $CO_2$ pump wave at 10.6 microns to a $CO_2$ energy detector 31 for detecting the energy of the 10.6 micron pulses. The other output of the beam splitter is fed to a spectral filter 32, such as a lithium fluoride crystal which selectively reflects the 16 micron Stokes wave and absorbs the remaining portion of the 10.6 pump wave. The reflected Stokes wave is reflected to a mirror 33 and thence through bandpass filters 34 to a pyroelectric energy detector 35 such as that commercially available from Laser Precision, Inc., of Utica, New York. The bandpass filters 34 are commercially available from OCLI Inc., of Santa Rosa, California.

The purpose of combining the 1.06 micron pump energy derived from the Nd:Yag laser with the 10.6 micron pump energy derived from the $CO_2$ laser in the Raman cell 24 is that the higher frequency, shorter wavelength pump beam, at 1.06 microns serves to lower the threshold power required for conversion of the longer wavelength pump beam at 10.6 microns into the down converted longer output Stokes wave at 16 microns. More particularly, the process is one of four wave mixing to reduce the power required to achieve stimulated Raman threshold at 10.6 microns because the Raman threshold at the shorter pump wavelength is significantly below that required at the longer wavelength pump energy of 10.6 microns. Thus, by exceeding the Raman threshold with the shorter wavelength pump, the Stokes wave is produced for amplification by the longer wavelength pump beam at 10.6 microns. The overall reduction in the power requirement for the longer wavelength pump by use of the aforecited shorter wavelength pump injection subsequent four wave mixing is a factor of 2–5 times. Furthermore, it permits the first few transits of the combined beams within the Raman cell 24 to be utilized for conversion of the shorter wavelength pump energy into a coherent Stokes wave at the desired 16 microns wavelength for amplification in subsequent passes of the combined beams through the Raman cell 24.

Referring now to FIGS. 1, 2, and 4, the design considerations and features of the Raman active cell 24 will be explained in greater detail. More particularly, if a ray of light is injected off axis into a stable optical resonator, it bounces back and forth between the mirrors. The rays on successive bounces walk in oscillatory motion across the surfaces of the mirrors. The rays are bounded by a maximum excursion from the center of the mirrors and are trapped by sufficiently large mirrors. Under proper initial conditions (initial ray slope and displacement), the rays can be made to walk in a circle around the rims of the mirrors. This is an attractive arrangement for a multipass cell 24. A properly mode matched laser beam can be injected into the resonator. After the desired number of transits, the beam can be coupled out of the resonator.

In terms of ray optics, the propagation of a ray in an optical resonator is equivalent to propagation through a system of equally spaced lenses.

In the multiple pass resonator there are a large number of possible ray paths. In this section, it is described how a ray propagates in the multiple pass resonator and how to choose the desired beam geometry. In addition, it is told how to focus properly into the resonator so that the beam diameter remains at a minimum from bounce to bounce.

A one dimensional resonator is shown in FIG. 2. In the usual convention, the resonator g parameters are defined by:

$$g_1 = 1 - L/R_1, \quad g_2 = 1 - L/R_2 \qquad \text{Eq. (1)}$$

where L is the resonator length and $R_1$ and $R_2$ are the radii of curvature of the mirrors.

This discussion is limited to stable resonators defined by $|g_1 g_2| \leq 1$. It is assumed that a ray of light is injected into the resonator and is bouncing back and forth between the mirrors. $r_n$ is defined as the ray displacement from the optic axis in the plane of mirror 1 on the $\eta$th round trip. Similarly, $r_n^1$ is the ray slope at mirror 1 on the $\eta$th round trip. Within the limitations of the paraxial ray approximation, it can be shown that $$r = r_o \cos N\theta + \frac{L g_2}{\sqrt{g_1 g_2 (1 - g_1 g_2)}} r_o^1 \sin N\theta \qquad \text{Eq. (2)}$$

where $r_o$, $r_o^1$ are the initial ray displacement and slope and $$\theta = \cos^{-1}(2g_1 g_2 - 1) \qquad \text{eq. (3)}$$

Thus, the ray walks in a sinusoidal motion along the surface of mirror 1, with amplitude determined by initial conditions and frequency determined by the resonator g parameters.

The analysis can be easily extended to two dimensions by allowing the beam to oscillate in both dimensions. The x and y coordinates of the ray in the plane of mirror 1 on the $\eta$th round trip are $$r_{nx} = r_{ox} \cos N\theta + \frac{L g_2}{\sqrt{g_1 g_2 (1 - g_1 g_2)}} r_{ox}^1 \sin N\theta \qquad \text{Eq. (4)}$$

$$r_{ny} = r_{oy} \cos N\theta + \frac{L g_2}{\sqrt{g_1 g_2 (1 - g_1 g_2)}} r_{oy}^1 \sin N\theta$$

The ray will in general follow an elliptical path on the surface of each mirror.

As a special case, let $$r_{oy} = r_{ox}^1 = 0 \qquad \text{Eq. (5)}$$

and $$\frac{L g_2}{\sqrt{g_1 g_2 (1 - g_1 g_2)}} r_{oy}^1 = r_{ox}$$

The ray displacement becomes $$r_{Nx} = r_{ox} \cos N\theta \qquad \text{Eq. (6)}$$

$$r_{ny} = r_{ox} \sin N\theta$$

The beam walks in a circle of radius $r_{ox}$ around the mirror, the angle between successive bounces being $\theta$.

The ray looks something like the illustration in FIG. 3. The radius of the circle that the rays intersect halfway between the mirrors is $$r_c = r_{ox} \left[ \frac{g_1 + 2 g_1 g_2 + g_2}{4 g_2} \right]^{\frac{1}{2}} \qquad \text{Eq. (7)}$$

The radius of the circle that the rays intersect on the second mirror is $$r_2 = r_{ox}(g_1/g_2)^{\frac{1}{2}} \qquad \text{eq. (8)}$$

More complicated beam patterns are possible if astigmatic mirrors are used. In the astigmatic case, the oscillation frequencies, $\theta$, are different in the x and y dimensions. The rays therefore walk in a lissajous pattern on the mirror surface.

Consider what happens when the rays are replaced by finite size laser beams. The laser beams, in addition to being steered in an elliptical pattern on the mirror surfaces are focused on each bounce. If the beams are to have the same diameter after each round trip, then the input beam must be properly mode matched or focused into the resonator.

The simplest case to analyze is the gaussian, TEM$_{oo}$, laser beam. For the stable, multipass resonator $(-1 \leq g_1 g_2 \leq +1)$, there will always exist a gaussian mode that will repeat itself after each round trip. A case of particular interest is the symmetric resonator in which $R_1 = R_2$. In this case, the beam focuses to a minimum spot size, $w_o$, at the center of the resonator and a maximum spot size, $w_m$ at the mirrors. The required spot sizes are $$w_o = \sqrt{\frac{\lambda}{2\pi}} \left[ \frac{1+g}{1-g} \right]^{\frac{1}{2}}, \qquad \text{Eq. (9)}$$

$$w_m = \sqrt{\frac{L\lambda}{2\pi}} \left[ \frac{4}{1-g^2} \right]^{\frac{1}{2}} \qquad \text{Eq. (10)}$$

where $$g_1 = g_2 = g$$

and $\lambda$ is the optical wavelength. If the initial beam is not properly mode matched, then the spot sizes and position of the focal plane will fluctuate from bounce to bounce.

If non-gaussian beams are focused into the cell, then the cell can only be approximately mode matched. However, this is not a severe limitation since small spot size fluctuations usually do not present a problem.

In summary, it has been shown how to design a multiple pass resonator that has the following features. It folds a long optical path into a convenient, compact volume. In addition, the periodic refocusing of the beam can keep it focused tightly over much of the long optical path length. It is these features that make the multipass cell 24 attractive for stimulated Raman scattering.

Stimulated Raman scattering has been used for efficient frequency conversion of coherent light sources. Stimulated Raman scattering is now briefly explained. A beam of intense light, called the pump, is shown into a Raman active medium, i.e., $H_2$, D, DH gas. The pump generates amplification, collinear with the pump beam, at a down shifted frequency called the Stokes frequency. The frequency shift is equal to an energy level spacing in the Raman medium and is a property of the material. The Stokes gain has the form $$G = P_o/P_i = e^{gl} \qquad \text{Eq. (11)}$$

where $P_o$ and $P_i$ are the Stokes output and input power and L is the distance the pump and Stokes beam propagate collinearly in the Raman medium g is the exponential gain coefficient that has the form $$g = KI_p/\lambda_s \qquad \text{Eq. (12)}$$

where $I_p$ is the pump intensity, $\lambda_s$ is the Stokes wavelength, and K is a constant that depends upon the Raman medium. In the usual case, no Stokes signal is injected into the Raman cell along with the pump. Instead, the Stokes output signal is generated by amplified spontaneous emission noise at the entrance of the cell. Since the noise signal is quite small, large gains (gL≅30) are required to generate a usable Stokes signal.

For visible and near infrared sources ($\lambda_s \leq 2.4$ μm), it is usually possible to generate sufficient gain in a reasonably short cell. However, as the pump and Stokes wavelengths are increased there are two factors that lower the gain. First of all, the exponential gain coefficient, g, decreases with Stokes wavelength. Second, diffraction at longer wavelengths is more pronounced and tends to spread the pump beam. This lowers the pump intensity and therefore the gain. By placing the multipass resonator 24 around the Raman medium, these problems can be overcome. The multipass cell keeps the pump beam focused to a high intensity over a long path length and therefore enhances the Stokes gain. The Raman gain coefficient increases linearly with the number of cell transits.

As far as the practical aspects of the cell design are concerned, the multipass resonator mirrors can be made of a metal such as copper, that is highly reflecting throughout the infrared. The number of cell transits is limited only by mirror reflectivity losses which are ~1% per reflection. It is possible to design the resonator 24 so that the pump intensity is as high as possible without damaging the mirrors or the Raman medium. The multipass cell can be scaled to large apertures which allows high peak and average throughout power. These attractive features make the multipass cell a useful device for doing stimulated Raman scattering and conversion of pump energy at wavelengths longer than 1 micron into high power output beams of Stokes wave energy at wavelengths from 1 micron to millimeter wavelengths. It is particularly useful for fown conversion of pump wave energy to output wavelengths around 16 microns in length for isotope separation, as above cited.

In one physical realization of the Raman cell 24, the cell includes a stainless steel tubular envelope 41 (See FIG. 1) flanged at both ends and closed off via end caps 42. The end mirrors 43 of the optical resonator are polished copper carried from the end caps 42 with spherically concave mirror surfaces of radii of curvature of two meters, i.e., focal lengths of 2 meters to provide focal points midway between the mirrors in the Raman active gaseous medium. The mirrors are 5 inches in diameter and are commercially available from Spawr Research of Corona, California.

A ½ inch diameter input steering mirror 44 is provided just inside the optical resonator near the periphery of the input main mirror 42 (See FIG. 4) to receive the input optical beam and to direct the beam longitudinally of the resonator to the other mirror and at an angle to the optical axis of the optical resonator so as to cause the beam to walk around the periphery of the mirrors 43 as shown in dotted lines in FIG. 4. An output steering mirror 45 is provided at the periphery of the output main mirror 43 to catch the last step of the walking beam and to direct the beam out of the resonator via output window 26.

The tubular geometry of the Raman cell and use of metallic mirrors 43 offers extremely wideband operation in the infrared wavelengths longer than 1 micron and in addition by water cooling of the mirrors 43 is directly scalable to very high average c.w optical powers in the order of hundreds of killowatts. This is readily accomplished by merely increasing the diameter of the mirrors 43 and tube 41.

What is claimed is:

1. In a method for wavelength conversion by Raman scattering, the steps of:
    directing a beam of pumping optical radiation of a wavelength greater than 1 micron into an optical resonator defined by the space between a pair of optical reflectors, said beam of optical radiation being directed into the optical resonator at an angle to the optical axis of the resonator such that the optical beam is caused to be reflected to and fro within said resonator between said reflectors over a path which includes a plurality of transits of said resonator and which path walks over the surfaces of the reflectors and out of said resonator;
    filling a region of space within said resonator with a Raman active gaseous medium for interaction with said beam of optical radiation for converting pump energy into stimulated Raman scattering radiation of a Stokes wavelength longer than that of said pump wave energy; and
    focusing the reflected beam on each transit of said resonator at a point within said Raman active gaseous medium for enhancing the Raman scattering interaction.

2. The method of claim 1 wherein said reflectors are concave metal mirrors having a focal length less than that of the spacing between said concave mirrors.

3. The method of claim 1 wherein said pump wave energy is of a wave length of approximately 10 microns and said Stokes wave has a wavelength of approximately 16 microns.

4. The method of claim 3 including the step of directing the Stokes wave beam into a gaseous stamophere of $^{235}UF_6$ and $^{238}UF_6$ to selectively dissociate the $^{235}UF_6$ into $^{235}UF_5$ and F.

5. In an apparatus for wavelength conversion by Raman scattering optical resonator means define by the space between a pair of optical reflectors;
    means for directing a beam of pumping optical wave rediation of a wavelength greater than 1 micron into said optical resonator at an angle to the optical axis of the resonator such that the optical beam is caused to be reflected to and fro within said resonator means between said reflectors over a path which includes a plurality of transits of said resonator and which path walks over the surfaces of said reflectors and out of said resonator means;
    means for filling a region of space within said resonator means with a Raman active gaseous medium for interaction with said beam of optical radiation for converting pump energy within said beam into stimulated Raman scattering radiation of a Stokes wavelength longer than that of said pump energy; and means for focusing the reflected beam on each transit of said resonator at a point within said Raman active gaseous medium for enhancing the Raman scattering interaction.

6. The apparatus of claim 5 wherein said reflectors comprise concave metal mirrors having a focal length less than that of the spacing between said concave mirrors.

7. The apparatus of claim 5 wherein said pump wave is of a wavelength of approximately 10 microns and said Stokes wave has a wavelength of approximately 16 microns.

8. The apparatus of claim 7 including means for directing the Stokes wavelength beam into a gaseous atmosphere of $^{235}UF_6$ and $^{238}UF_6$ to selectively dissociate the $^{235}UF_6$ into $^{135}UF_5$ and F.

* * * * *